Sept. 17, 1935. H. L. MYERS Re. 19,707

LIGHT WEIGHT SURFACING MACHINE

Original Filed Sept. 16, 1931 4 Sheets-Sheet 1

Inventor

Harry L. Myers

By Clarence A. O'Brien

Attorney

Sept. 17, 1935. H. L. MYERS Re. 19,707

LIGHT WEIGHT SURFACING MACHINE

Original Filed Sept. 16, 1931 4 Sheets-Sheet 2

Inventor

Harry L. Myers

By Clarence O'Brien

Attorney

LIGHT WEIGHT SURFACING MACHINE
Original Filed Sept. 16, 1931 4 Sheets-Sheet 3
Fig. 9.
Fig. 3.
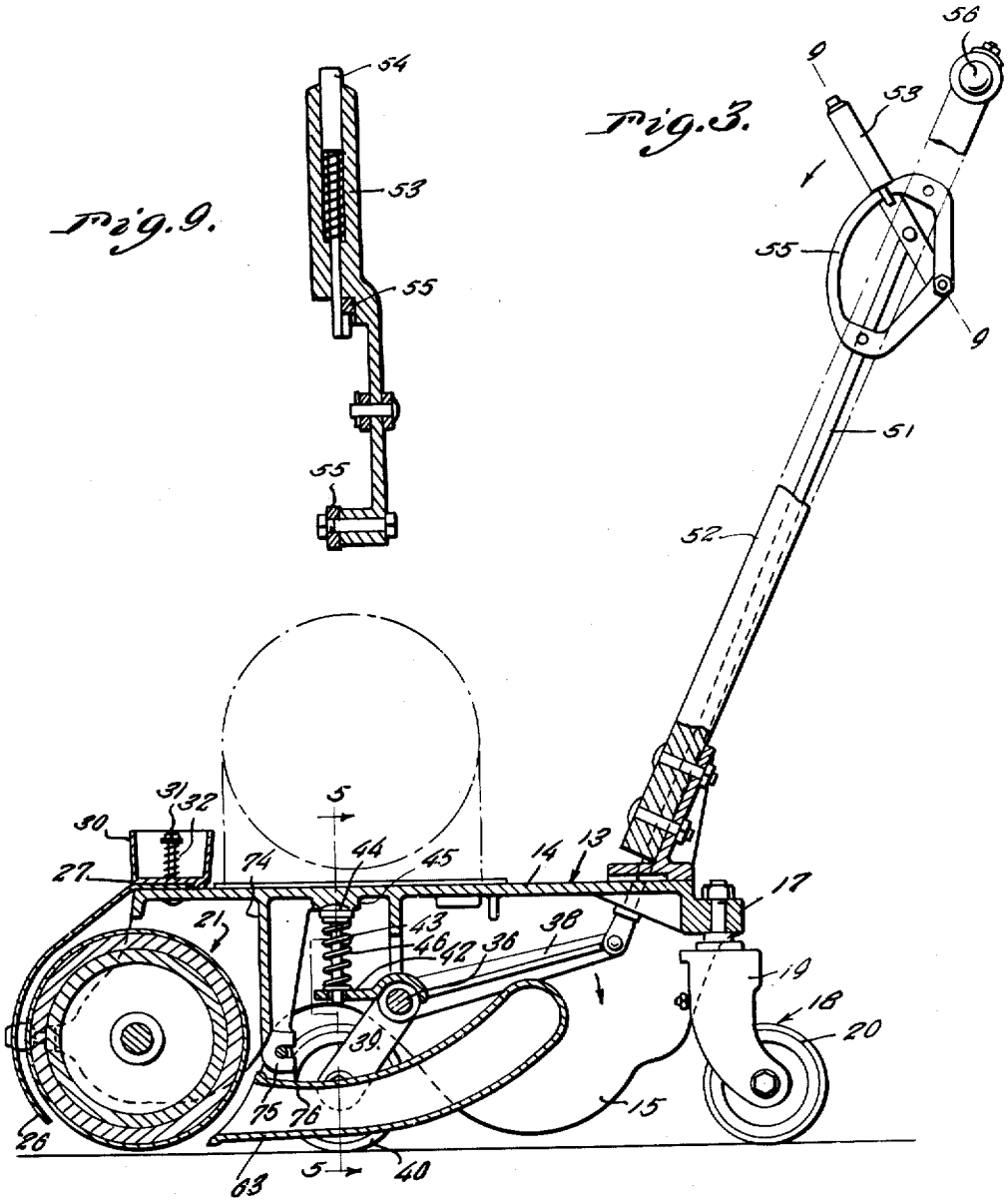
Fig. 8.
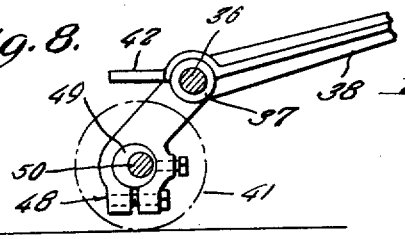
Inventor
Harry L. Myers
By Clarence O'Brien
Attorney

LIGHT WEIGHT SURFACING MACHINE

Original Filed Sept. 16, 1931 4 Sheets-Sheet 4

Inventor

Harry L. Myers

By Clarence A. O'Brien

Attorney

Reissued Sept. 17, 1935

Re. 19,707

UNITED STATES PATENT OFFICE 19,707

LIGHT WEIGHT SURFACING MACHINE

Harry L. Myers, Toledo, Ohio, assignor to The American Floor Surfacing Machine Company, Toledo, Ohio Original No. 1,934,814, dated November 14, 1933, Serial No. 563,183, September 16, 1931. Application for reissue June 21, 1935, Serial No. 27,742

12 Claims. (Cl. 51—176)

This invention relates to an improved light weight portable sanding machine of the electric motor operated type, constructed to be steered and controlled by a walking attendant.

Visualized structurally, and expressed more explicitly, the inventive conception has to do with the production of a machine of the aforesaid type which is especially, but not necessarily, designed for sanding and conditioning floors, said machine being characterized by the now generally common structural arrangement involving a vertically tiltable motor carrying frame having a frontal horizontal rotary servicing drum, a single swivelly mounted caster at the rear of the frame, and a manually regulated adjusting and transporting wheeled truck on the frame between the drum and caster.

In reducing the invention to actual practice, I have evolved and completed a machine which, it is believed, will supersede similar marketed and prior art machines due to the fact that it is more modern and practical, rugged, smooth and quiet in operation, continuous and gratifying in performance, and otherwise distinguishable as a novel contribution to the art in that it is supplied with new and novel improvements destined to better fulfill the requirements of a machine of this class.

The progressive and commercial advantages of this revised and refined machine will be expressed in the concluding portion of the description and preceded by a brief description of the views of the drawings and a numerical identification of parts in the customary detailed description.

In the drawings:

Figure 3 is a lonigtudinal vertical sectional view showing the general ensemble and employed primarily to illustrate the suspension means for the intake pan of the dust collector.

Figure 8 is a detail sectional view illustrating the eccentric bushing feature of the truck wheels.

Figure 9 is a section on the line 9—9 of Figure 3.

Figures 1, 12:
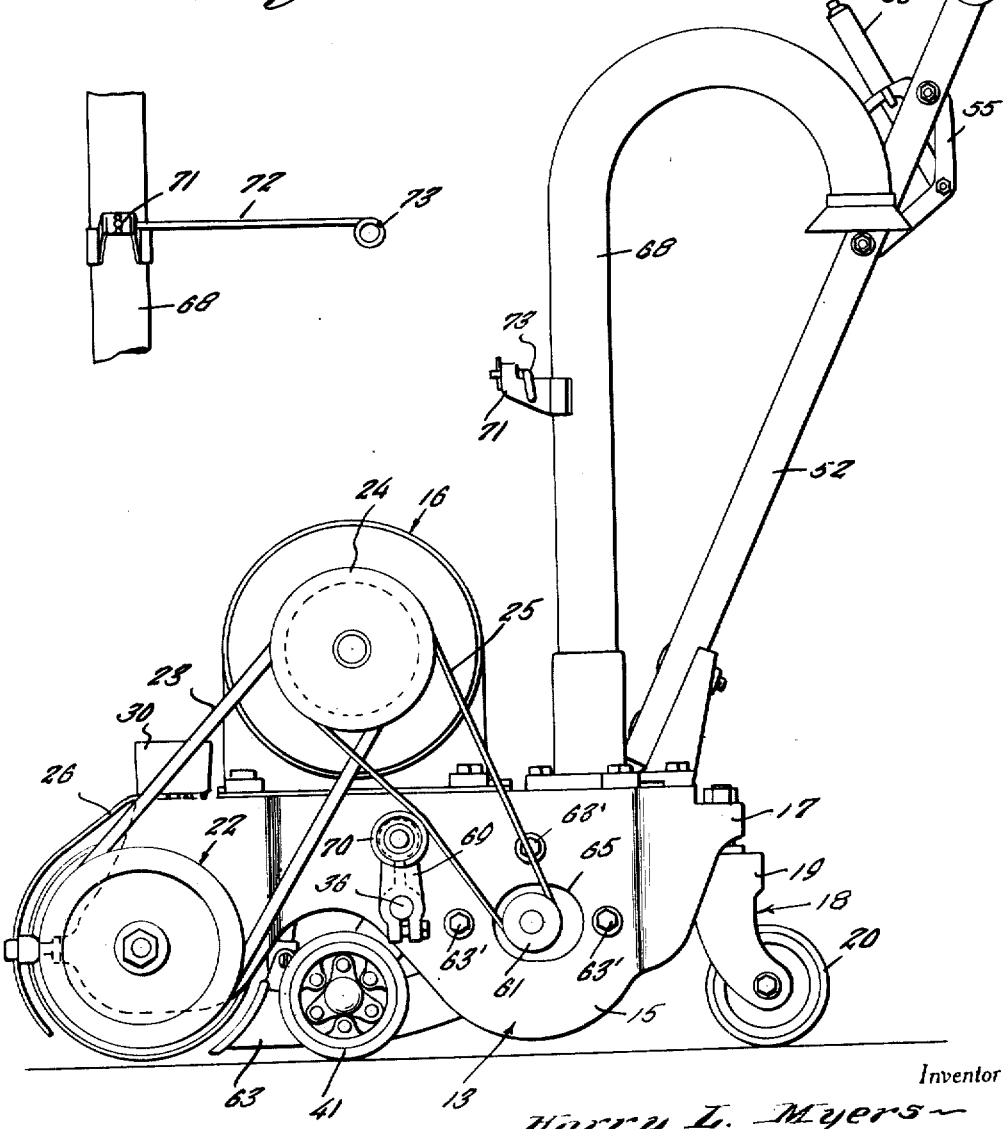
Figure 1 is a side elevational view of a complete light weight floor surfacing machine designed and developed in accordance with the principle of my invention.
Figure 12 is an incidental view disclosing a bracket and pivoted suspension arm adapted to accommodate a trailing cable or cord to be connected to a plug or similar outlet.

The frame is generally denoted throughout the drawings by the numeral 13 and this comprises an aluminum casting which is substantially channel-shaped in cross section. It embodies a flat top plate 14 and a pair of duplicate depending spaced parallel side flanges 15, the top plate being fashioned to accommodate an electric motor 16 and other parts to be hereinafter described.

The rear end portion of the casting is designed with an extension 17 to accommodate the caster 18. The caster is of simple form and embodies a yoke 19 whose spindle is swivelly mounted in the extension 17, said yoke carrying a rubber tired wheel 20.

The forward end portions of the side flanges are suitably apertured (not shown) to provide bearings for the surfacing drum 21. It is to be pointed out that the drum is provided with appropriate means (not claimed) to accommodate the abrasive paper. Moreover, the drum is rigidly mounted for rotation on the frame. In addition, at one end and on the exterior of the frame is a propulsion pulley 22 grooved to accommodate the motor driven belt 23. Incidentally the motor is provided with a pulley 24 to accommodate this belt as well as a supplemental rearwardly diverging belt 25 which operates the dust collector unit to be hereinafter described.

Figure 10:
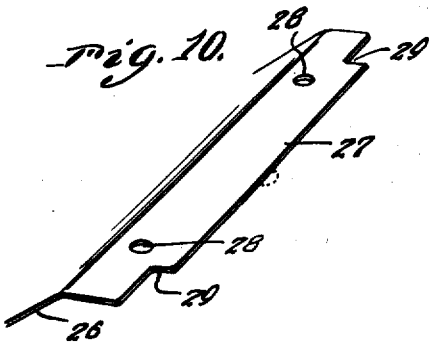
Figure 10 shows an important feature in the construction of the notched attaching flange of the aforesaid shield.
Figure 4:
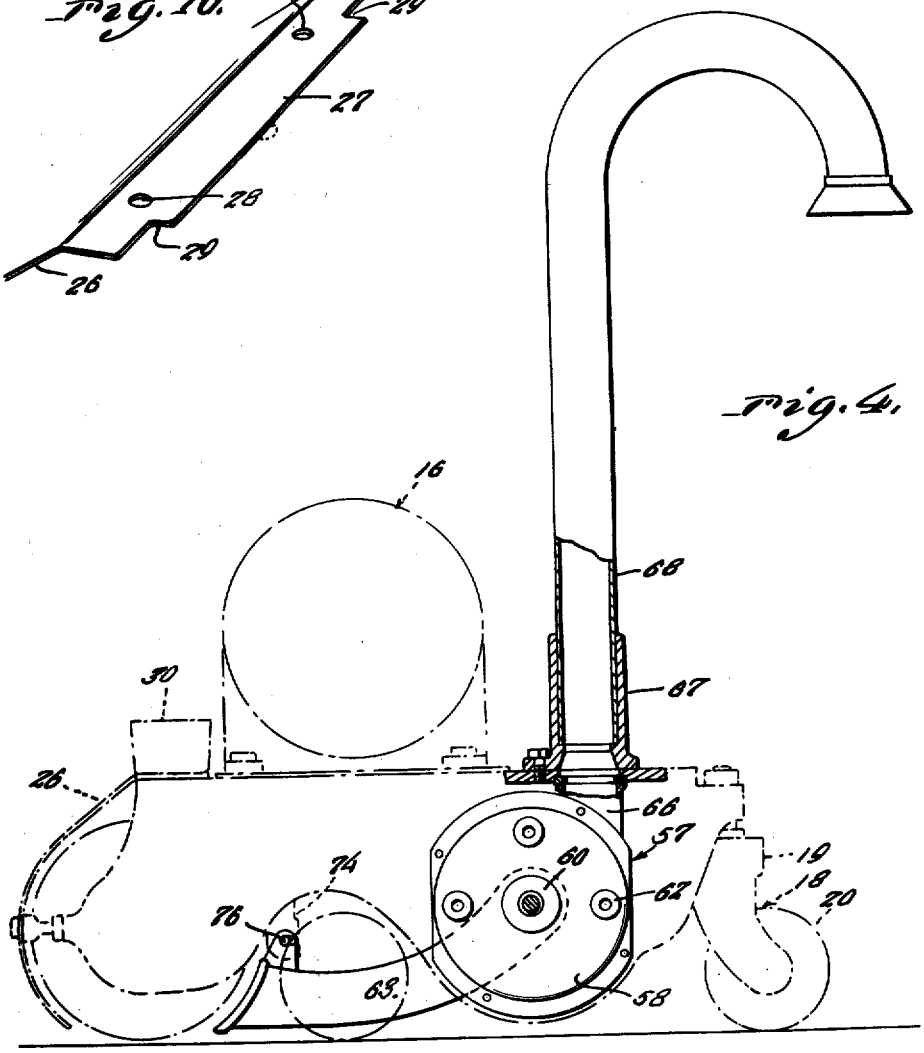
Figure 4 is a view in section and elevation disclosing the major portions of the machine in phantom form in order to emphasize the bodily removable dust collector unit (in full lines).

In connection with the drum, I call attention to the numeral 26 which represents a suitably curved shield co-operable with the protruding portion of the surfacing drum. In connection with this shield, I invite attention to Figure 10 wherein it will be observed that it is provided with an attaching flange 27 having apertures 28 and end notches 29.

Figure 7:
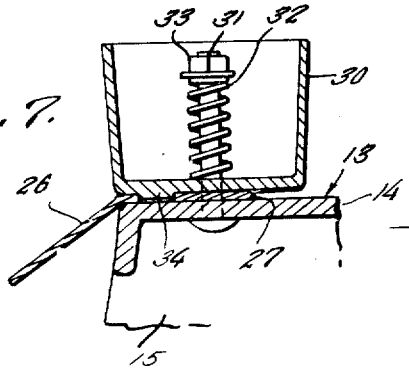
Figure 7 is a sectional view disclosing the quick separable connection between the sanding drum shield and the associated tool box.
Figure 11:
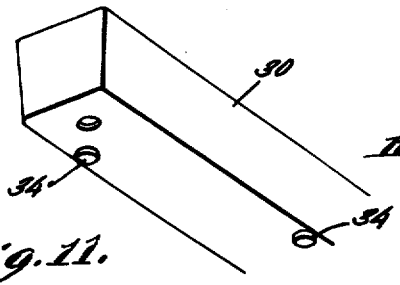
Figure 11 is an underside perspective view of the tool box showing the studded formation thereof.

Next I call attention to the numeral 30, which as seen in Figure 11 designates a tool box intended to accommodate tools (not shown). As seen in Figure 7, the tool box is held in place by bolts 31 on the frame and each bolt is surrounded by a coil spring 32. At its upper end the spring bears against the adjusting nut 33 while at its lower end it bears against the bottom of the box for holding the box yieldably down on the frame.

On the exterior of the bottom the box is formed with lugs 34 which engage in the notches and openings 28 and 29, whereby to permit the spring pressed tool box to serve as the means for removably attaching the shield to the frame. Incidentally this shield has to be taken off in order to obtain access to the abrasive paper on the drum for exchanging it, and inasmuch as convenient means must be provided for accommodating the tool, it has been found practical and expedient to produce this novel co-ordination between the tool box and the shield whereby the lugs and apertures co-operate with one another to provide the desired quick detachable connection between the shield, frame, and spring-pressed tool box.

A feature of cardinal importance is found in the provision of novel and practical means for transporting the frame and its accessories as well as for gradually raising and lowering the surfacing drum. Inasmuch as the drum is rigidly mounted in the frame, the means selected for accomplishing this result must be of such exacting formation and design as to provide the desired continuous gradual lowering of the drum into contact with the floor so as to avoid a bang-down impact floor gouging action.

The means is generally and broadly referred to as a wheeled truck. In fact, it is a two wheeled truck characterized by a special rocker mounting and manually controlled adjusting means. Considering this arrangement systematically, I call attention to Figure 5 for example, wherein it will be observed that the side flanges are provided with inwardly protruding bearings 35 which accommodate a horizontally disposed transversely positioned fulcrum rod 36.

Figure 6:
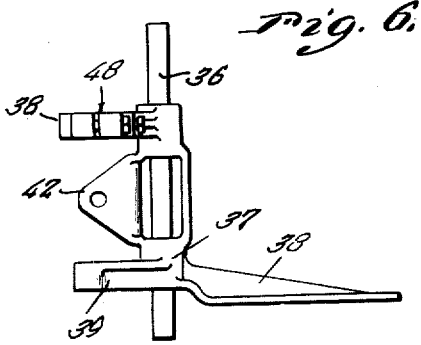
Figure 6 is a plan view observing the bottom of the frame or rocker of the wheeled truck structure.

Rockably mounted on the intermediate portion of the rod and confined between the bearings is a single casting which constitutes the mounting. This is detailed in Figure 6 and it will be observed that it comprises a tubular rock shaft 37 having an actuating arm 38 at one end and provided at opposite ends with a pair of carrier arms 38 and 39 for the wheels 40 and 41. In addition the intermediate portion of the rocker shaft is formed with an apertured ear 42 which as seen in Figure 3 slidably and loosely receives the lower end of a pin 43. The upper end of the pin is formed with a head 44 movably seated in a socket 45 on the top 14 of the frame. A coil spring 46 of an expansion type, surrounds this stem or pin, bearing at its upper end against the head 44 and its lower end against the ear 42. This exerts the desired downward yieldable stress on the arms and wheels 40 and 41 to maintain the latter in contact with the floor and to gradually resist the receding of the truck toward the frame in order to lower the drum into contact with the floor.

Figure 5:
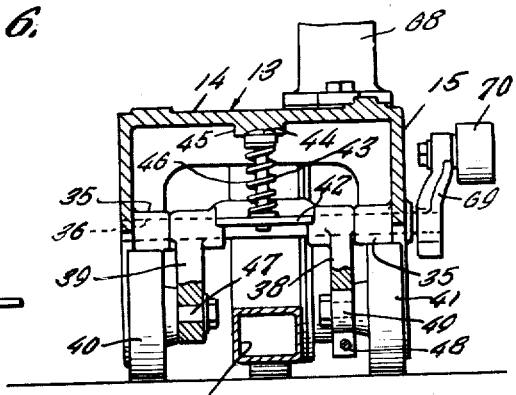
Figure 5 is a transverse vertical section on the line 5—5 of Figure 3.

Considering Figure 5 further, it will be observed that the arm 39 has an ordinary bearing hole to accommodate the stub shaft 47 of the wheel 40. The arm 38 however terminates in a split clamp 48 which as seen in Figure 8 is provided to accommodate an eccentric bushing 49 in which the stub shaft 50 of the wheel 41 is rotatable. Obviously, this bushing is adjustable to allow the peripheral portion of the wheels 40 and 41 to be alined true with the periphery of the drum 21. This is primarily a manufacturing feature, but is believed to be absolutely essential in a machine of this kind as will be later pointed out.

As disclosed better in Figure 3, the actuating arm 38 projects towards the rear of the frame where it is pivotally connected with a push rod 51 which extends up alongside of the rigidly mounted handle 52 to a point where it is pivotally connected with the operating lever 53. The lever is provided with a spring pressed latch 54 of a button type which latch is co-operable with the notched maintenance segment 55 on the handle. The handgrips are designated by the numerals 56.

In order to lower the drum into contact with the floor, it is necessary to release the latch 54 and to allow the lever 53 to move downwardly. This exerts downward stress on the push rod 51 forcing the arm 38 downwardly in the direction of the arrow in Figure 3 and lifting the truck and its wheels against the tension of the spring 46. A reverse operation of these details serves to lower the truck and to thereby raise the drum.

Figure 2:
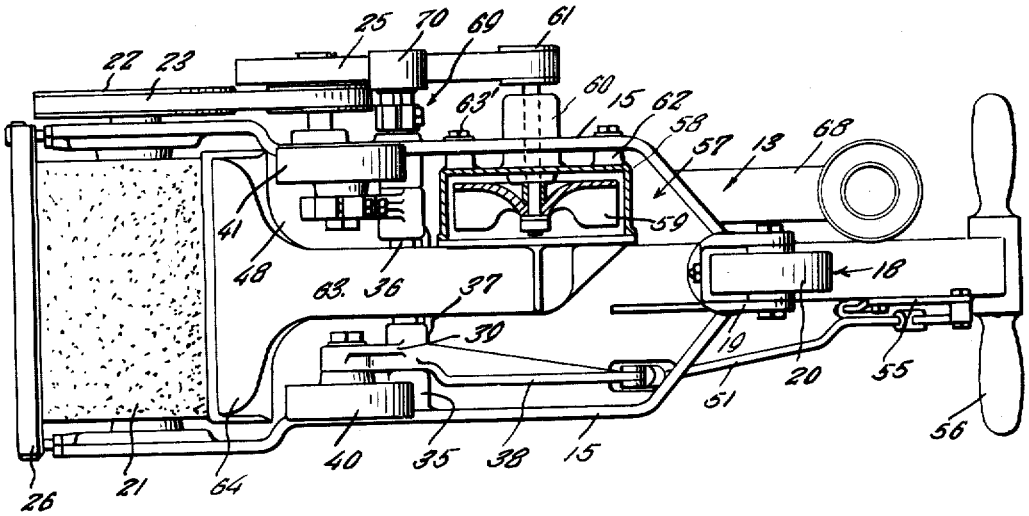
Figure 2 is a bottom plan view of Figure 1 with portions of the dust fan casing broken away and shown in section.

An added feature of importance and economy is designated generally by the numeral 57. This is to be hereinafter known as the dust collector, and as the name implies it embodies means for collecting the dust generated by the sanding drum 22 and conveying it by suitable means into a depository such as a bag or the like (not shown). As seen in Figure 2, one part of the unit is designated by the numeral 58, this being a housing for the rotary fan 59, such fan having a shaft extending through the projecting bearing 60 and provided with a pulley 61 over which the aforesaid belt 25 is trained.

The fan casing is provided with lugs 62 secured by bolts or the like 63' to the adjacent wall or flange of the frame. The dust is conveyed into the fan housing by way of a centralized longitudinally extending duct 63 having an intake nozzle 64 functioning as an accumulating pan and co-operating with the adjacent surface of the abrading drum. This dust collector unit or assembly is such as to allow the bearing 60 to project through and beyond an aperture 65 in the flange 15 as shown in Figure 1. This unit of the dust collecting means is bodily removable from the frame, and this is important in that it facilitates assembling and subsequent repair and adjustment.

The marginal discharge neck 66 is arranged in alinement with a socket 67 carried by the top wall of the frame and constituting attaching means for the gooseneck pipe 68. The dust collecting bag (not shown) is of course attached to and suspended from the discharge end of this pipe in actual practice.

All of the details selected are appropriately arranged to contribute their proportionate share in providing the desired co-operation and mutual mechanical association. As an added feature, I allow one end of the rod 36 to protrude sufficiently far beyond the flange 15 to accommodate the attaching arm 69 carrying a belt tensioning pulley 70. This idler pulley is adjusted to bear against the adjacent flight of the belt 25.

Moreover, in actual practice, I have found it desirable to have a fixture or bracket such as is indicated at 71 in Figure 12, this being mounted on the pipe 68 and serving as a holder for the swingably mounted wire arm 72. This arm 72 terminates in an eye 73 which is adapted to accommodate the trailing wire (not shown) which is obviously attached to a floor plug or similar outlet for applying current to the motor Incidentally, the switch for controlling the current is omitted for clearness in disclosure.

It is evident that the single motor 16 serves to simultaneously drive the sanding drum as well as the fan in the dust collector housing, this being accomplished through the medium of the duplex belts 23 and 25 respectively. In addition, it is evident that the frame and wheeled truck structure is supported on the single cross rod 36, said cross rod having the additional function of a mounting for the belt tensioning means 70.

The wheels on the truck are proportioned and spaced apart so as to nest themselves nicely in the adjacent notched formation of the side walls 15 of the frame, and in order to further add to the rigidity of the construction, I provide a hanger arm 74 (see Figure 3) having a hook 75 to receive a pin 76 on an ear carried by the intake end of the dust collector duct 63.

It might be added that the machine is equipped with a heavy duty motor mounted on a one-piece aluminum frame with the sanding drum rigidly mounted in the frame, the sanding drum being raised and lowered from the floor with the exclusive truck control which has proved to be a most satisfactory arrangement for the purpose desired. In order to obtain an appreciation of additional features and advantages, I now call attention to the following:

*Drum mounting:*—The drum mounting is one of the most important features in a sanding machine. In fact, the entire performance of the machine depends greatly upon how the drum is mounted, and in all cases, it should be mounted as rigidly as is possible to do so. The sanding drum in this machine is rigidly mounted in the frame and with an arrangement of this nature, there is no danger of the sanding drum getting out of alignment with the truck wheels, and in addition to this, there are no suspended arms which tend to spring or vibrate excessively causing the drum to thump on the floor leaving vibration marks in the finished surface.

In addition to this, all drum springs are eliminated and loose connections are not necessary which avoids the danger of the drum arms getting loose in a very short time, which in turn will permit the sanding drum to vibrate in the suspended arms which of course leaves various imperfections in the floor, and most important of all, when the drum is bouncing or vibrating on the floor, the production of the machine is greatly reduced due to the fact that the abrasive paper is not constantly in contact with the floor at all times with the maximum amount of pressure on the abrasive paper. This may seem rather insignificant, but, nevertheless, it is a fact, and is a very important consideration when attempting to give the trade a machine with the maximum amount of capacity that will retain this original maximum capacity over a long period of time.

*Drum control:*—A machine may be worked out very efficiently, but if the method of controlling the drum is not seriously considered, all of the remarkable features incorporated in the machine are lost if a highly sensitive drum control is not provided. It is very important as soon as the latch on the control handle is released that the tendency of the control handle is to pull down on the operator's hand at all times, otherwise, if this tension does not remain in a downward direction as the drum is being lowered to the floor, the sensitive control necessary is entirely lost and usually the drum drops heavily and suddenly to the floor, which in turn leaves a deep drum mark wherever this occurs.

Where it is necessary to push down on the control handle to release the drum and then instantly after it is released to pull back in an opposite direction, this seldom can be accomplished because the action is taking place so rapidly that one cannot change from a pushing direction to a pulling direction quickly enough to prevent the sanding drum from forcibly coming in contact with the floor, which in turn in all cases leaves a very deep drum mark which shows prominently in the floor after it is finished.

This improved drum control has been in use and has proven itself, to be the most ideal arrangement through continuous service, and in practically all cases most purchasers demand this method of control, otherwise, they are aware of the fact that the machine cannot be efficiently operated minus this very important feature.

*Drum pressure:*—In order to maintain simplicity in construction and operation of the machine, and at the same time, get maximum capacity, it is necessary to properly distribute the weight of the machine so that the proper weight is applied at all times on the sanding drum while it is in contact with the surface to be sanded. This is accomplished by the special truck wheel bracket, which permits the sanding drum to be lowered to the floor, and, at the same time, when this operation takes place, the weight of the machine is so suspended from the swivel caster on the rear of the machine that the entire weight of the machine rests entirely on the sanding drum and the swivel caster at the rear of the machine.

This method of distributing the weight to the sanding drum is ideal, due to the fact that the swivel caster and the drum are so far apart that the suspension from these two points permits the designing of the machine to distribute the weight of the motor and other heavy parts of the machine so that the greatest portion of the weight is applied on the sanding drum, whereas with most other types of machines the frame of the machine is usually fulcrumed or practically balanced on a rod which passes through approximately at the middle of the frame of the machine, which in turn makes it necessary to add heavy weights on the front of the machine in order to try and get sufficient pressure on to the sanding drum to make it cut rapidly.

The foregoing and other features and advantages of the invention have doubtless been made apparent and will be clear to persons skilled in the art to which the invention relates. For this reason, a more lengthy description is deemed to be unnecessary, for the explicit novelty will be readily discernible from the following claims.

I claim:

1. A portable floor surfacing machine of the type specified comprising a frame of horizontally elongated form, a transverse rod mounted on the intermediate portion of the frame, a swivel caster at the rear of the frame, a horizontally disposed surfacing drum rigidly mounted for rotation in bearings on the frontal portion of the frame, a truck embodying a rocker mounted for oscillation on said rod, said rocker including a rearwardly projecting actuating arm, a pair of carrier arms, rollers mounted on said carrier arms, the rocker also including an apertured forwardly extending ear, a pin having its lower end passing through the aperture in said ear and having its upper end bearing against the adjacent portion of the frame, a coil spring surrounding said pin bearing at it lower end on said ear and at its upper end against the pin, and control means on the frame connected to the actuating arm of said rocker.

2. The structure specified in claim 1, said pin having a head on its upper end, and the frame being formed with a socket in which said head has universal mounting.

3. A portable surfacing machine of the class described comprising a frame, horizontally elongated, a swivelly mounted caster on the rear end portion of the frame, a surfacing drum rigidly mounted for rotation on the frontal portion of the frame, a horizontal rod constituting a rock shaft mounted on the intermediate portion of the frame between the drum and caster, a truck embodying a single casting including a tubular rocker shaft mounted for oscillation on said rock shaft, a pair of forwardly and downwardly inclined arms having bearings, wheels mounted for rotation in said bearings, said casting also including a forwardly projecting apertured ear and a rearwardly projecting actuating arm, said frame being formed above said ear with a depending socket, a headed pin having its headed end mounted for adjustment in said socket, the lower end of said pin extending down through the aperture in said ear, a coil spring bearing at its lower end against the ear and at its upper end against the head, and control means on the frame connected to the actuating arm of said rocker.

4. A portable surfacing machine of the class described comprising a frame, horizontally elongated, a swivelly mounted caster on the rear end portion of the frame, a surfacing drum rigidly mounted for rotation on the frontal portion of the frame, a horizontal rod constituting a rock shaft mounted on the intermediate portion of the frame between the drum and caster, a truck embodying a single casting including a tubular rocker shaft mounted for oscillation on said rock shaft, a pair of forwardly and downwardly inclined arms having bearings, wheels mounted for rotation in said bearings, said casting also including a forwardly projecting apertured ear and a rearwardly projecting actuating arm, said frame being formed above said ear with a depending socket, a headed pin having its headed end mounted for adjustment in said socket, the lower end of said pin extending down through the aperture in said ear, a coil spring bearing at its lower end against the ear and at its upper end against the head, control means on the frame connected to the actuating arm of said rocker, a suction means, a drive means from the suction means including a belt, and a tensioning means for said belt mounted on said rod.

5. A surfacing machine of the class described comprising a frame, a horizontal surfacing drum rigidly mounted for rotation in the front portion of the frame, operating means for said drum on said frame, a double-wheeled transporting and drum-adjusting truck mounted on said frame for limited oscillation, said truck embodying a pair of companion wheels, one of said wheels having an adjustable eccentric connection with the adjacent portion of the truck mounting to allow the peripheral portion of the wheels to be adjusted with respect to the peripheral portion of the drum for accurate assemblage and complete drum surfacing action.

6. A surfacing machine of the class described comprising a horizontally elongated frame embodying a top wall and a pair of depending side flanges forming side walls, guiding means attached to the rear end portion of the frame, an abrasive surfacing drum rigidly mounted for rotation and bearings in the front portion of the frame, said drum being confined between said side walls, a horizontal rod supported between said side walls in the rear of the drum, a truck embodying a mounting supported for rocking movements on said rod, operating means for said mounting, said mounting including a pair of downwardly and forwardly inclined arms, one of said arms being formed with a split bolt equipped clamp and set screw, an eccentrically apertured bushing mounted in said clamp, and a pair of truck wheels, one of said truck wheels having a spindle co-operable with said bushing so as to allow said bushing to be adjusted to align the peripheral portion of the truck wheels with the peripheral portion of said drum for the purpose specified.

7. In a portable sanding machine of the class described, a frame, steering and guiding means on the rear end of the frame, a motor driven surfacing drum on the front portion of the frame, a toolbox having spaced studs on its underside, bolts mounted in said frame and extending through said toolbox into the interior thereof, springs surrounding the extending portions of the bolts and serving to yieldably hold the toolbox down at the frame, a curvate shield for said drum, said shield being formed at its inner end with an apertured flange interposed between the frame and bottom of the toolbox, the studs being cooperable with the apertures to releasably hold the shield in place.

8. A portable surfacing machine of the class described comprising a horizontally elongated frame, a horizontally disposed surfacing drum rigidly mounted for rotation on the forward end portion of the frame, a swivelly mounted caster on the rear end of the frame, a shaft rigidly mounted on the intermediate portion of the frame between the drum and caster, a drum control and transporting truck comprising a mounting mounted for oscillation on said shaft, said mounting including forwardly and downwardly inclined carrier arms, a rearwardly and upwardly inclined actuating arm, surface-contacting wheels on the carrier arms, control means for said truck mounted on the frame and attached to said actuating arm, automatically operable spring tensioning and compensating means interposed between the frame and truck mounting and located above the truck wheels and in front of said shaft to exert a constant downward yielding pressure on the wheels and an upward pressure on said actuating arm.

9. A portable floor surfacing machine of the type specified comprising a horizontally elongated frame, a surfacing drum rigidly mounted for rotation on the frontal portion of the frame, a caster on the rear portion of the frame, a handle connected to and rising from the rear portion of the frame, a truck embodying a rocker mounting pivoted for limited oscillation on the intermediate portion of the frame between the caster and drum, said mounting including a rearwardly projecting integral actuating arm, a pair of integral forwardly and downwardly projecting carrier arms, rollers mounted on said carrier arms, said mounting also including an integral forwardly projecting ear overlying said rollers, a vertical pin connected at its lower end to said ear, the upper end of said pin having universal connection with the frame, an expansion coil spring surrounding said pin and bearing at its lower end against said ear and at its upper end against the pin, and means associated with said handle and connected to said actuating arm to control the frame movements.

10. In a surfacing machine of the class described, a horizontally elongated frame, a guiding support attached to the rear end of the frame, a surfacing drum rotatably carried by the front end of the frame for supporting such end, a wheeled truck attached to the frame adjacent to the front support, said truck being mounted for rocking movements in a vertical plane to serve as an intermediate support for the frame and having downwardly extending wheel-carrying arms and a rearwardly extending actuating arm, a control for said actuating arm, and means yieldingly acting on the truck to rock the truck in a direction to urge the wheel-carrying arms downward.

11. In a surfacing machine of the class described, a frame, rolling supports for the frame at opposite ends thereof, one of said supports being a surfacing drum, a vertically adjustable support for the frame intermediate said other supports, said adjustable support comprising a member mounted for vertical rocking movements and having a wheel-carrying part adjacent said drum and a rearwardly extending actuating arm, manual control means for said actuating arm, and spring means acting on said member to urge a rocking of the member in a direction to move said wheel-carrying part downward relative to the frame.

12. In a machine of the class described, a main frame, rolling supports for the frame at opposite ends, one support being a surfacing drum, a truck providing an additional support for the frame intermediate said first supports, said truck including a vertically rockable frame having at least one downwardly extending arm, a rearwardly extending arm and a thrust arm, control means attached to said rearwardly extending arm, a supporting wheel carried by said downwardly extending arm, and a spring connecting said main frame and thrust arm and acting to urge a downward movement to said wheel.

HARRY L. MYERS.